June 24, 1930.  D. W. GRIFFITH  1,767,668

MEANS AND METHOD FOR TAKING MOVING PICTURES

Filed April 12, 1926

INVENTOR
David Wark Griffith
BY
O'Ellery Edwards
ATTORNEY

Patented June 24, 1930

1,767,668

UNITED STATES PATENT OFFICE

DAVID WARK GRIFFITH, OF NEW YORK, N. Y.

MEANS AND METHOD FOR TAKING MOVING PICTURES

Application filed April 12, 1926. Serial No. 101,299.

The object of my invention is to take a picture with peculiar light and shadow effects and this is done by interposing between the actor and the camera and separated from both, a screen with an image thereon which is so arranged and disposed that the screen is practically transparent to all light rays from the actor to the camera until the light is thrown diagonally on the screen, which brings out the image and shows the same against the actor, whereby the actor appears with curious light and shadow effects.

This object is accomplished by my invention, one embodiment of which is hereinafter more particularly set forth.

Figure 1:
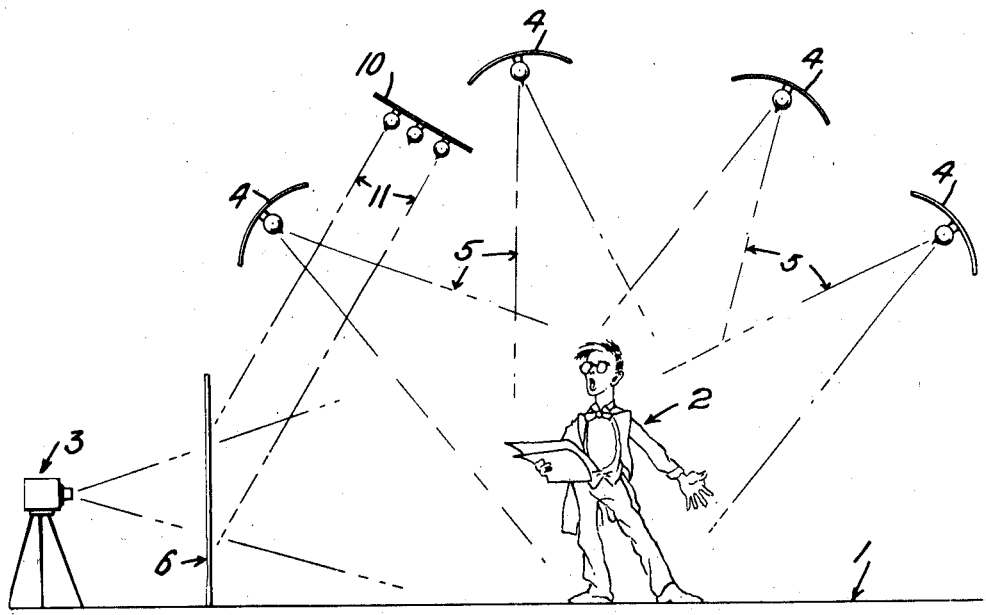

For a more detailed description of my invention, reference is had to the accompanying drawings, forming a part hereof, in which Figure 1 is a diagrammatic view showing my invention.

Figure 2:
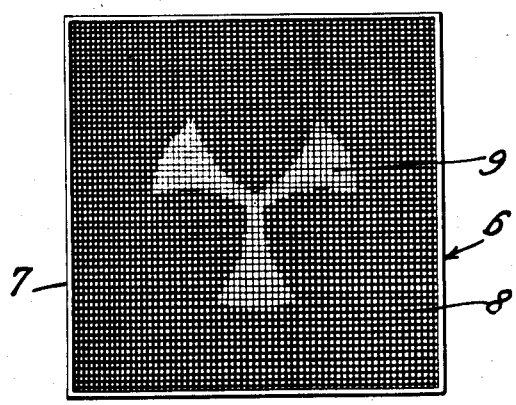

Figure 2 is a front elevation of a screen.

Throughout the various views of the drawings, similar reference characters designate similar parts.

A floor 1 carries an actor 2 who acts before a camera 3 in the usual manner. The camera 3 is the ordinary moving picture camera and is operated in the usual manner. The actor is illuminated by various lights 4 arranged at any desired locations and these lights throw their rays 5 upon the actor so as to illuminate him and show his acting to advantage. The rays of light from the actor 2 to the camera 3 pass through a screen 6 which is composed of a frame 7 across which is stretched a gauze 8 in the conventional manner. This gauze may be black except for a figure 9, which is white, or the figure may be black and the gauze white or any other contrasting colors may be used or any kind of figure may be used that is desired.

A special light 10 or series of lights is arranged to throw rays 11 upon the screen 6 in any suitable way, as diagonally. These lights 10 may be turned on or off as desired, according to when the peculiar shadow effects are desired.

This invention may be used in any of many ways, one of which will now be described. Assuming that the actor acts in the usual manner and lights are on him and his picture is taken by the camera 3. His picture will be the ordinary picture although it is taken through the screen 6. At the desired moment, the lights 10 are turned on and then the effect of the screen is altered, the figure 9 standing out between the actor and the camera so that the picture then receives a peculiar shadow effect which is ultimately transferred to the positive, so that when the picture is transferred to a screen, it will have light and shadow effects of peculiar charm.

While I have shown and described one embodiment of my invention, it is obvious that it is not restricted thereto, but that it is broad enough to cover all structures and methods that come within the scope of the annexed claims.

What I claim is:

1. Means for taking moving pictures with peculiar shadow effects which consist of a camera, means for supporting an actor, a screen with an image thereon which is invisible unless oblique lights are thrown on the screen and two sets of lights, one adapted to be thrown on an actor so that he may perform while the camera functions through the screen and another set of lights adapted to be thrown obliquely on the screen so as to bring out an image thereon so that the camera will photograph the image superimposed on the actor.

2. The process of making moving pictures which consists in positioning a screen having an image thereon which is invisible unless oblique lights be thrown on the screen, illuminating an actor by a series of lights, illuminating with oblique rays the screen by an independent light source, positioning the camera before the screen and substantially in alignment with the actor and exposing a previously unexposed sensitive film within the camera and before the illuminated screen.

Signed at the city, county and State of New York, this 8th day of April, 1926.

DAVID WARK GRIFFITH.